United States Patent
Maeda (10) Patent No.: US 10,924,631 B2
(45) Date of Patent: Feb. 16, 2021

(54) IMAGE FORMING APPARATUS, IMAGE FORMING METHOD, AND MEDIUM STORING PROGRAM EXECUTABLE BY IMAGE FORMING APPARATUS

(71) Applicant: BROTHER KOGYO KABUSHIKI KAISHA, Nagoya (JP)

(72) Inventor: Takashi Maeda, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/798,571

(22) Filed: Feb. 24, 2020

(65) Prior Publication Data
US 2020/0314285 A1    Oct. 1, 2020

(30) Foreign Application Priority Data
Mar. 28, 2019    (JP) .............................. JP2019-064901

(51) Int. Cl.
*H04N 1/333*    (2006.01)
*H04N 1/32*    (2006.01)

(52) U.S. Cl.
CPC ..... *H04N 1/33307* (2013.01); *H04N 1/32368* (2013.01); *H04N 2201/33357* (2013.01); *H04N 2201/33378* (2013.01)

(58) Field of Classification Search
None
See application file for complete search history.

(56) References Cited

U.S. PATENT DOCUMENTS

| | | | | |
|---|---|---|---|---|
| 4,668,114 A | * | 5/1987 | Katsukawa | B41J 19/142 400/279 |
| 5,168,373 A | * | 12/1992 | Nakamura | H04N 1/00002 358/406 |
| 5,572,329 A | * | 11/1996 | Otsubo | G06K 15/105 347/3 |
| 5,719,686 A | | 2/1998 | Sakamoto et al. | |
| 5,751,449 A | | 5/1998 | Nobuta | |
| 5,801,846 A | | 9/1998 | Nobuta | |
| 5,838,822 A | | 11/1998 | Nobuta | |
| 5,956,162 A | | 9/1999 | Nobuta | |

(Continued)

FOREIGN PATENT DOCUMENTS

| | | |
|---|---|---|
| JP | H07-203223 A | 8/1995 |
| JP | 2001-285593 A | 10/2001 |

*Primary Examiner* — Anh-Vinh T Nguyen
(74) *Attorney, Agent, or Firm* — Scully, Scott, Murphy & Presser, PC (57) ABSTRACT

An image forming apparatus includes: a key receiving a copy-start instruction and an input of a number of copies depending on a number of times that the key is operated; a scanner reading an image of a document and generating image data relating to the image; a printer recording the image on a sheet; a memory; and a controller. The controller controls the scanner and the printer to execute, depending on the number of times that the key is operated: (1) direct copy of storing parts of the image data relating to the image successively in the memory, and of reading the parts of the image data from the memory to record the image data on the sheet, or (2) memory copy of storing entirety of the image data in the memory, and of successively reading parts of the stored image data to record the image on the sheet.

4 Claims, 7 Drawing Sheets

(56) References Cited

U.S. PATENT DOCUMENTS

| | | | | |
|---|---|---|---|---|
| 5,984,454 A | * | 11/1999 | Takahashi | H04N 1/6097 347/43 |
| 6,364,446 B1 | * | 4/2002 | Ishikawa | G06K 15/107 347/15 |
| 9,648,203 B2 | * | 5/2017 | Tabushi | H04N 1/32673 |
| 10,723,136 B2 | * | 7/2020 | Kayanaka | G06K 15/107 |
| 2007/0035573 A1 | * | 2/2007 | Hoshi | B41J 2/16547 347/22 |
| 2008/0062449 A1 | * | 3/2008 | Shimura | G03G 15/607 358/1.13 |
| 2008/0180714 A1 | * | 7/2008 | Ishikawa | H04N 1/0097 358/1.13 |
| 2009/0009790 A1 | * | 1/2009 | Hosokawa | G06K 17/0025 358/1.14 |

* cited by examiner

IMAGE FORMING APPARATUS, IMAGE FORMING METHOD, AND MEDIUM STORING PROGRAM EXECUTABLE BY IMAGE FORMING APPARATUS

CROSS REFERENCE TO RELATED APPLICATION

The present application claims priority from Japanese Patent Application No. 2019-064901 filed on Mar. 28, 2019, the disclosure of which is incorporated herein by reference in its entirety.

BACKGROUND

Field of the Invention

The present disclosure relates to an image forming apparatus, etc.

Description of the Related Art

A facsimile apparatus having a copying function is known. In a case that copying is performed in this facsimile apparatus, either (i) memory copy is performed in a case of black and white mode and a direct copy is performed in a case of color mode, or (ii) the memory copy is performed in both of the case of black and white mode and the case of color mode.

SUMMARY

However, a literature relating the above-described facsimile apparatus does not discloses any function of setting the number of copies (number of copies to be recorded) depending on the number of times that a start key is pressed. Accordingly, the literature also does not disclose any problem which might occur at a time of performing switching between the direct copy and the memory copy on the premise that the above-described function is provided.

The present disclosure is made in view of the above-described problem, and an object of the present disclosure is to provide an image forming apparatus, etc., capable of performing a copying processing quickly in a configuration wherein the number of copies is set and the switching between the direct copy and the memory copy is performed, depending on the number of times that the start key is pressed.

According to a first aspect of the present disclosure, there is provided an image forming apparatus including: a key configured to receive a copy-start instruction to start copying and an input of a number of copies to be recorded depending on a number of times that the key is operated; a scanner configured to read an image of a document and to generate image data relating to the image; a printer configured to record the image relating to the image data generated by the scanner, on a sheet; a memory; and a controller, wherein the controller is configured to control the scanner and the printer to execute, depending on the number of times that the key is operated: (1) direct copy of storing parts of the image data relating to the image successively in the memory, and of reading the parts of the image data from the memory in a storing order thereof to record the image on the sheet; or (2) memory copy of storing entirety of the image data in the memory, and of successively reading parts of the stored image data to record the image on the sheet, the scanner is provided with: a sensor configured to obtain the image data; and a position determining part configured to determine a position of the sensor, the controller is configured to position the sensor at a first position and a second position different from the first position, each of the first position and the second position being a position at which shading correction data is obtained, the shading correction data being usable for shading correction performed by the scanner, the controller is configured to execute the direct copy in a case that the key is operated one time, the controller is configured to switch the direct copy to the memory copy in a case that the key is operated multiple times, if the position determining part determines that the sensor is positioned at the first position under a condition that a second operation is performed to the key, the controller is configured to control the scanner to obtain first shading correction data for the memory copy at the first position, and to obtain second shading correction data for the memory copy at the second position after obtaining the first shading correction data for the memory copy, and if the position determining part determines that the sensor is positioned at the second position under the condition that the second operation is performed to the key, the controller is configured to control the scanner to obtain the first shading correction data for the memory copy at the second position, and to obtain the second shading correction data for the memory copy at the first position after obtaining the first shading correction data for the memory copy.

According to a second aspect of the present disclosure, there is provided an image forming method, in an image forming apparatus provided with: a key configured to receive a copy-start instruction to start copying and an input of a number of copies to be recorded depending on a number of times that the key is operated; a scanner configured to read an image of a document and to generate image data relating to the image; a printer configured to record the image relating to the image data generated by the scanner, on a sheet; and a memory, the image recording method comprising executing, by the scanner and the printer, depending on the number of times that the key is operated: (1) direct copy of storing parts of the image data relating to the image successively in the memory, and of reading the parts of the image data from the memory in a storing order thereof to record the image on the sheet; or (2) memory copy of storing entirety of the image data in the memory, and of successively reading parts of the image data and to record the image on the sheet, wherein the scanner is provided with: a sensor configured to obtain the image data; and a position determining part configured to determine a position of the sensor, the sensor is configured to obtain shading correction data at a first position and a second position different from the first position, the shading correction data being usable for shading correction performed by the scanner, in a case that the key is operated one time, the direct copy is executed, in a case that the key is operated multiple times, the direct copy is switched to the memory copy, if the position determining part determines that the sensor is positioned at the first position under a condition that a second operation is performed to the key, first shading correction data for the memory copy is obtained by the sensor at the first position, and second shading correction data for the memory copy is obtained by the sensor at the second position after the first shading correction data for the memory copy is obtained, and if the position determining part determines that the sensor is positioned at the second position under the condition that the second operation is performed to the key, the first shading correction data for the memory copy is obtained by the sensor at the second position, and the second shading correction data for the memory copy is obtained by the sensor at the first position, after the first shading correction data for the memory copy is obtained.

According to a third aspect of the present disclosure, there is provided a non-transitory computer-readable medium storing a program executable by a processor of an image forming apparatus, the image forming apparatus including: a key configured to receive a copy-start instruction to start copying and an input of a number copies to be recorded depending on a number of times that the key is operated; a scanner configured to read an image of a document and to generate image data relating to the image; a printer configured to record the image relating to the image data generated by the scanner, on a sheet; a memory; and the processor, the program, when executed by the processor, causing the image forming apparatus to control the scanner and the printer to execute, depending on the number of times that the key is operated: (1) direct copy of storing parts of the image data relating to the image successively in the memory, and of reading the parts of the image data from the memory in a storing order thereof to record the image on the sheet, or (2) memory copy of storing entirety of the image data in the memory, and of successively reading parts of the stored image data to record the image on the sheet, the scanner is provided with: a sensor configured to receive the image data; and a position deter mining part configured to determine a position of the sensor, the program causes the sensor to be positioned at a first position and a second position different from the first position, each of the first position and the second position being a position at which shading correction data is obtained, the shading correction data being usable for shading correction performed by the scanner; the program causes the image forming apparatus to execute the direct copy in a case that the key is operated one time, the program causes the image forming apparatus to switch the direct copy to the memory copy in a case that the key is operated multiple times, if the position determining part determines that the sensor is positioned at the first position under a condition that a second operation is performed to the key, the program causes the scanner to obtain first shading correction data for the memory copy at the first position, and causes the scanner to obtain second shading correction data for the memory copy at the second position after causing the scanner to obtain the first shading correction data for the memory copy, and if the position determining part determines that the sensor is positioned at the second position under the condition that the second operation is performed to the key, the program causes the scanner to obtain the first shading correction data for the memory copy at the second position, and causes the scanner to obtain the second shading correction data for the memory copy at the first position after causing the scanner to obtain the first shading correction data for the memory copy.

According to the first to third aspects of the present disclosure, the first shading correction data for the memory copy is obtained at the second position, and then the sensor is moved to the first position and the second shading correction data for the memory copy is obtained at the first position. Therefore, it is possible to shorten the time for obtaining the first shading correction data and the second shading correction data. Namely, in a configuration wherein the number of copies (number of the copies to be recorded) is set and the switching between the direct copy and the memory copy is performed depending on the number of times that the start key is pressed, the copying processing can be performed quickly.

DESCRIPTION OF THE EMBODIMENTS

In the following, an embodiment of the present disclosure will be explained in detail.

<Configuration of Image Forming System>

Figure 1:
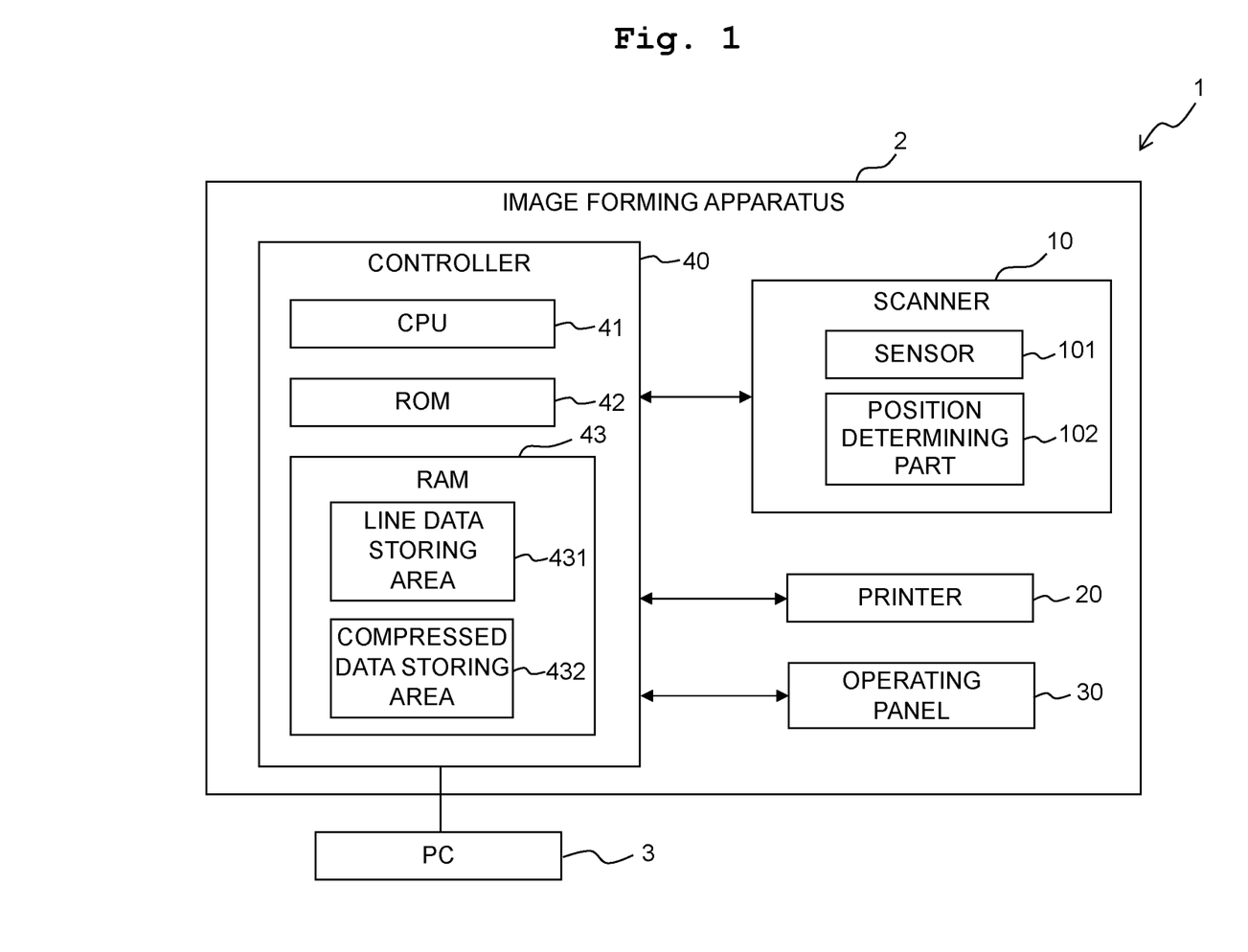
FIG. 1 is a block diagram depicting an image forming system according to an embodiment of the present disclosure.

As depicted in FIG. 1, an image forming system 1 is provided with an image forming apparatus 2 configured to read an image of a document (original, manuscript) and to record the read image on a sheet, and a PC 3 capable of controlling the image forming apparatus 2.

The image forming apparatus 2 is realized, for example, by a copying machine, a facsimile machine or a multi-function peripheral. The PC 3 is connected to the image forming apparatus 2 wirelessly or via a wire. In a case, for example, that an instruction inputted by a user is transmitted from the PC 3 to the image forming apparatus 2, the image forming apparatus 2 executes a processing based on the instruction. As depicted in FIG. 1, the image forming apparatus 2 is provided with a scanner 10, a printer 20, an operating panel 30 and a controller 40.

The scanner 10 reads an image of a document and generates image data regarding the image. The scanner 10 is provided with a sensor 101 and a position determining part 102. The sensor 101 is an image sensor obtaining image data relating to the image which is printed on the document. Further, the sensor 101 obtains shading correction data for performing shading correction with respect to the obtained image data. A method for obtaining the shading correction data by the sensor 101 will be described later on. The sensor 101 is, for example, a CIS (Contact Image Sensor) or a CCD (Charged Coupled Device) image sensor. The position determining part 102 determines (obtains) the position of the sensor 101, for example, by an encoder. The scanner 10 may be capable of performing color reading or may be capable of performing monochromatic reading.

The printer 20 records, on a sheet, an image regarding the image data which is generated by the scanner 10. The system by which the image is formed by the printer 20 may be an electro-photographic system or an ink-jet system. In a case of the electro-photographic system, the image is recorded on the sheet by transfer. In a case of the ink-jet system, the image is recorded on the sheet by discharge of ink. Further, although the printer 20 is capable of selectively performing formation of color image and formation of monochromatic image, it is allowable that the printer 20 is capable of forming only either one of a color image and a monochromatic image. In the following explanation, a series of operations which are: reading the image and conveying the sheet up to a recording position, then performing recording of the image while conveying the sheet, and discharging the sheet after the completion of recording (namely, a series of operations relating to a reading operation and a recording operation) are referred to as "copy" or "copying".

Figure 2:
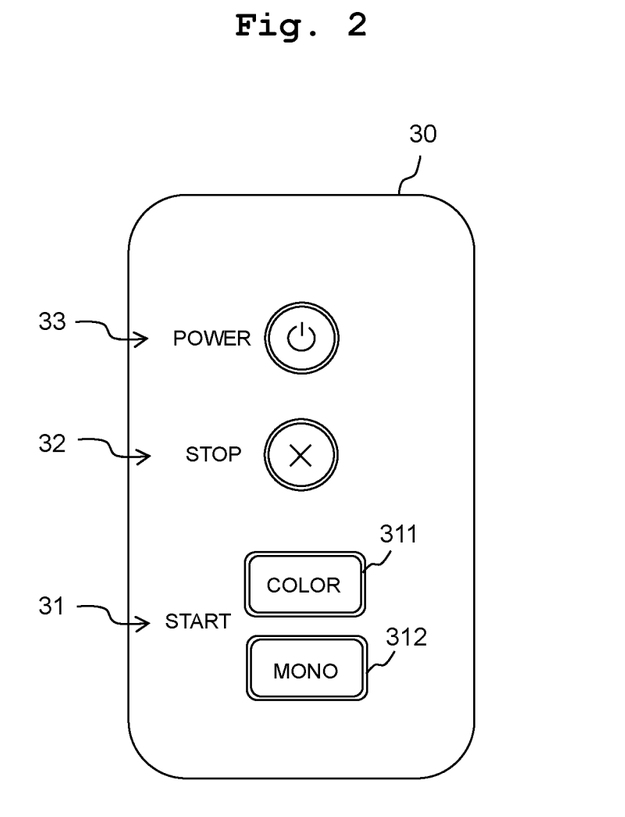
FIG. 2 is a view depicting an operating panel.

The operating panel 30 receives or accepts an input from a user. As depicted in FIG. 2, the operating panel 30 is provided with a start key 31 via which a copy-start operation can be inputted, a stop key 32 via which a copy-stop operation can be inputted, and a power source key 33 via which a switching operation for switching ON/OFF of the power source can be inputted. In a case that the start key 31 is pressed or pushed by the user, the printer 20 records an image on a sheet; in a case that the stop key 32 is pressed by the user, the printer 20 stops the recording. The start key 31 is an example of a "key".

It is allowable that the key is not realized by a physical start key 31. For example, in a case that the operating panel 30 is constructed of a touch panel, the start key 31 is realized by a virtual key displayed on the touch panel. This is similarly applicable to the stop key 32, as well.

As depicted in FIG. 2, the start key 31 includes a color start key 311 for starting color copying and a monochromatic start key 312 for starting monochromatic copying. In a case that the image forming apparatus 2 is dedicated to the color copying or dedicated to the monochromatic copying, it is allowable that a single start key 31 is provided. Further, it is also allowable to provide an operating key which is separated from the start key 31 and via which selection can be made between the color copying and the monochromatic copying.

Furthermore, as depicted in FIG. 2, the operating panel 30 is not provided with a key via which the user inputs a number of copies (number of copies to be recorded) before starting the operation of reading an image. In the image forming apparatus 2, the start key 31 is used to input the number of copies. Specifically, the number of copies is set depending on the number of times that the start key 31 is pressed by the user. For example, in a case that the start key 31 is pressed one time, "one copy" is set as the number of copies, and in a case that the start key 31 is pressed two times, "two copies" is set as the number of copies. By not providing any key for inputting the number of copies in such a manner, the operation panel 31 can be simplified, thereby making it possible to produce an inexpensive image forming apparatus 2.

The controller 40 is provided with a CPU (Central Processing Unit) 41, a ROM (Read Only Memory) 42, and a RAM (Random Access Memory) 43. The CPU 41 controls the respective constitutive elements (parts, components) of the image forming apparatus 2, by performing a processing in accordance with a controlling program read from the ROM 42 and storing a result of the processing in the RAM 43.

The RAM 43 is provided with a line data storing area 431 and a compressed data storing area 432. The line data storing area 431 and the compressed data storing area 432 are each an example of a "memory". It is allowable that the RAM 43 is an example of the "memory".

The line data storing area 431 is an area in which a part of image data generated by the scanner 10 is written, the part being a part of the image data which is to be actually recorded on the sheet. The phrase of "(a) part of the image data" means image data corresponding to a several lines (line data) among image data generated from one piece of document. The compressed data storing area 432 is an area in which compressed data obtained by compressing image data generated by the scanner 10 is stored.

The CPU 41 performs overall control of the image forming apparatus 2. The CPU 41 is an example of a "controller". Specifically, the CPU 41 sets the number of copies depending on the number of times by which the start key 31 is pressed by the user. Further, the CPU 41 causes the printer 20 to record an image on the sheet, by executing either one of direct copy and memory copy.

The direct copy is a processing of storing a plurality of pieces of line data successively in the line data storing area 431, and of performing reading of the plurality of pieces of line data from the line data storing area 431 in a storing order thereof and performing recording based on the plurality of pieces of line data. The memory copy is a processing of storing compressed data, which is obtained by compressing the entirety of the image data, in the compressed data storing area 432 and then of reading of parts of the stored image data as a plurality of pieces of line data successively from the compressed data storing area 432 and performing recording based on the plurality of pieces of line data.

The CPU 41 performs switching between the direct copy and the memory copy in accordance with the number of times by which the start key 31 is pressed by the user (number of times by which the start key is operated by the user). In the present embodiment, the CPU 41 starts a processing relating to the direct copy in a case that the start key 31 is pressed for the first time and the CPU 41 receives a copying instruction for the first copy. In a case that the start key 31 is pressed further and the CPU 41 receives an additional instruction to add the number of copies, the CPU 41 stops the processing regarding the direct copy, and switches to a processing regarding the memory copy.

In a case of the direct copy, the CPU 41 generates first image data for the direct copy having a first resolution. In the example depicted in FIG. 3, the first image data is RAW image data of 600 dpi (dots per inch) generated by the scanner 10. Namely, the generating processing of the first image data by the CPU 41 is a generating processing of the image data by the scanner 10.

Figure 3:
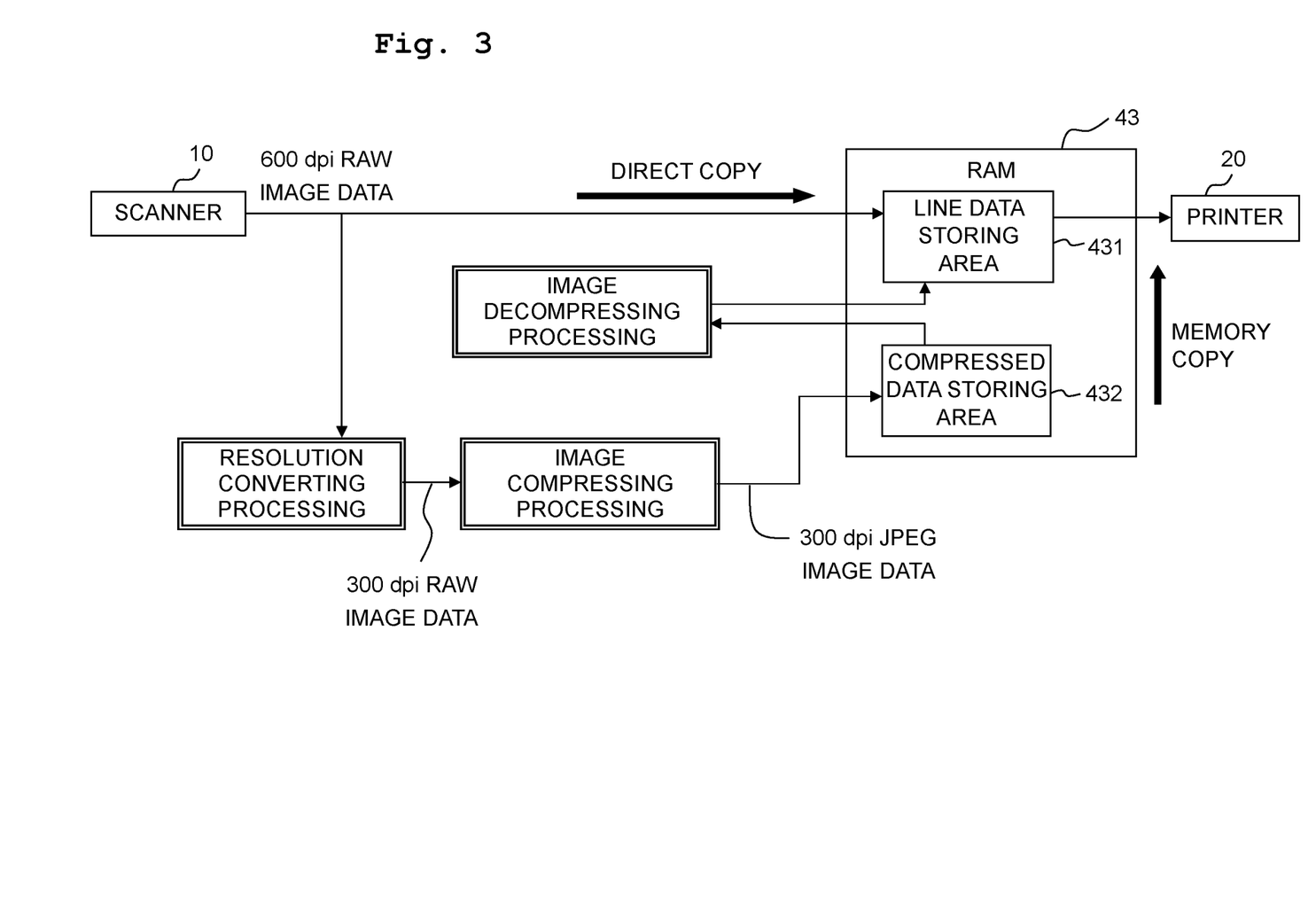
FIG. 3 is a view depicting an example of processing of direct copy and memory copy.

As depicted in FIG. 3, in the case of the direct copy, the CPU 41 stores, in the line data storing area 431, parts of the first image data successively as a plurality pieces of line data, and transmits the plurality pieces of line data from the line data storing area 431 to the printer 20 in an order by which the plurality pieces of line data are stored in the line data storing area 431. The printer 20 records, on a sheet, the images relating to the received plurality pieces of line data.

On the other hand, in the case of the memory copy, the CPU 41 generates second image data for the memory copy having a second resolution which is lower than the first resolution. Specifically, the CPU 41 performs a resolution converting processing with respect to the image data generated by the scanner 10, and generates the second image data for the memory copy which has the second resolution lower than the first resolution. In the example depicted in FIG. 3, the second image data generated by the resolution converting processing is RAW image data of 300 dpi.

Afterwards, the CPU 41 performs an image compressing processing with respect to the second image data, and stores the compressed second image data in the compressed data storing area 432. In the example depicted in FIG. 3, the RAW image data of 300 dpi is compressed, and JPEG image data of 300 dpi is generated.

In such a manner, the CPU 41 performs the resolution converting processing and the image compressing processing, and stores the entirety of the second image data generated from one piece of document in the compressed data storing area 432. The CPU 41 reads, as the plurality of pieces of line data, the compressed second image data stored in the compressed data storing area 432 and performs an image decompressing processing therefor, and stores the plurality of pieces of line data in the line data storing area 431.

Then, the CPU 41 transmits, as the plurality of pieces of line data, the parts of the second image data from the line data storing area 431 to the printer 20 in an order by which the plurality of pieces of line data are stored in the line data storing area 431. The printer 20 records an image relating to the transmitted plurality of pieces of line data on the sheet.

Note that in the memory copy, the entirety of the second image data is required to be stored in the compressed data storing area 432, as described above. Thus, the data size is reduced by executing the resolution converting processing and the image compressing processing.

Figure 4:
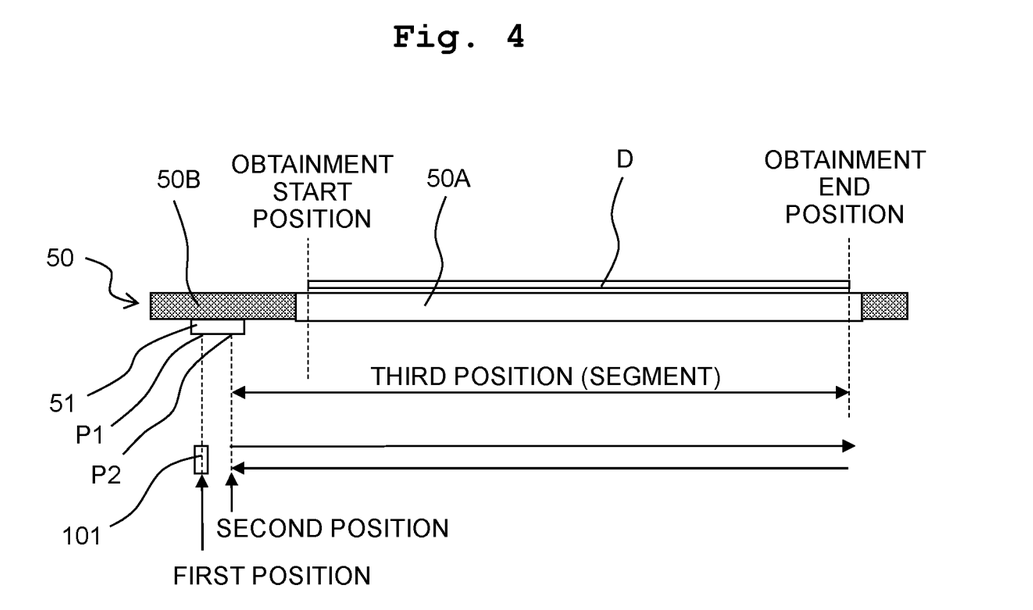
FIG. 4 is a view depicting a situation of reading image data in an image forming apparatus.

Next, the method of obtaining the shading correction data by the sensor 101 will be explained with reference to FIG. 4. As depicted in FIG. 4, the image forming apparatus 2 is provided with a document base 50 on which a document D is placed. The document base 50 is provided with a reading area 50A having a translucency and an area 50B adjacent to an end part on one side in a sub scanning direction (left/right direction in FIG. 4) of the reading area 50A. The reading area 50A is an area in which image data of the document D can be read by the sensor 101.

The image forming apparatus 2 is provided with a reference member 51 to obtain shading correction data. The reference member 51 is located on the rear side of the area 50B (namely, an opposite side, in the document base 50, to the side on which the document D is placed). The reference member 51 is a member of which color is white.

In the image forming apparatus 2, as depicted in FIG. 4, by using the sensor 101, the shading correction data is obtained at a first obtaining position P1 and a second obtaining position P2, which is different from the first position P1, in the reference member 51. The second obtaining position P2 is closer to the reading area 50A than the first obtaining position P1. In the following explanation, a position of the sensor 101 where the sensor 101 obtains the shading correction data of the first obtaining position P1 is referred to as a "first position", and a position of the sensor 101 where the sensor 101 obtains the shading correction data of the second obtaining position P2 is referred to as a "second position". Further, in the following explanation, a position (segment) between the second position and an obtainment end position at which the sensor 101 stops the obtainment of the image data (note that both end parts in the sub scanning direction thereof are not included) is referred to as a "third position (third segment)". Note that before the copying is started, the sensor 101 is positioned at the first position.

The CPU 41 uses one of the two pieces of the shading correction data which is considered as having a high reliability, to thereby perform the shading correction with respect to the image data read by the sensor 101. In this case, for example, if any foreign matter such as waste, contaminant, debris, etc., is present in one of the first obtaining position P1 and the second obtaining position P2, it is possible to perform the shading correction more accurately by using the shading correction data of the other of the first obtaining position P1 and the second obtaining position P2.

Next, the image forming method performed by the CPU 41 will be explained by using FIGS. 5A to 5C. Here, methods of obtaining the image data and the shading correction data performed by the scanner 10 will be explained. This processing is an example of an image forming method (image formation executing step) of the image forming apparatus 2. Note that in FIGS. 5A to 5C, the shading correction data is indicated as correcting data, for the purpose of simplification.

Figure 5A:
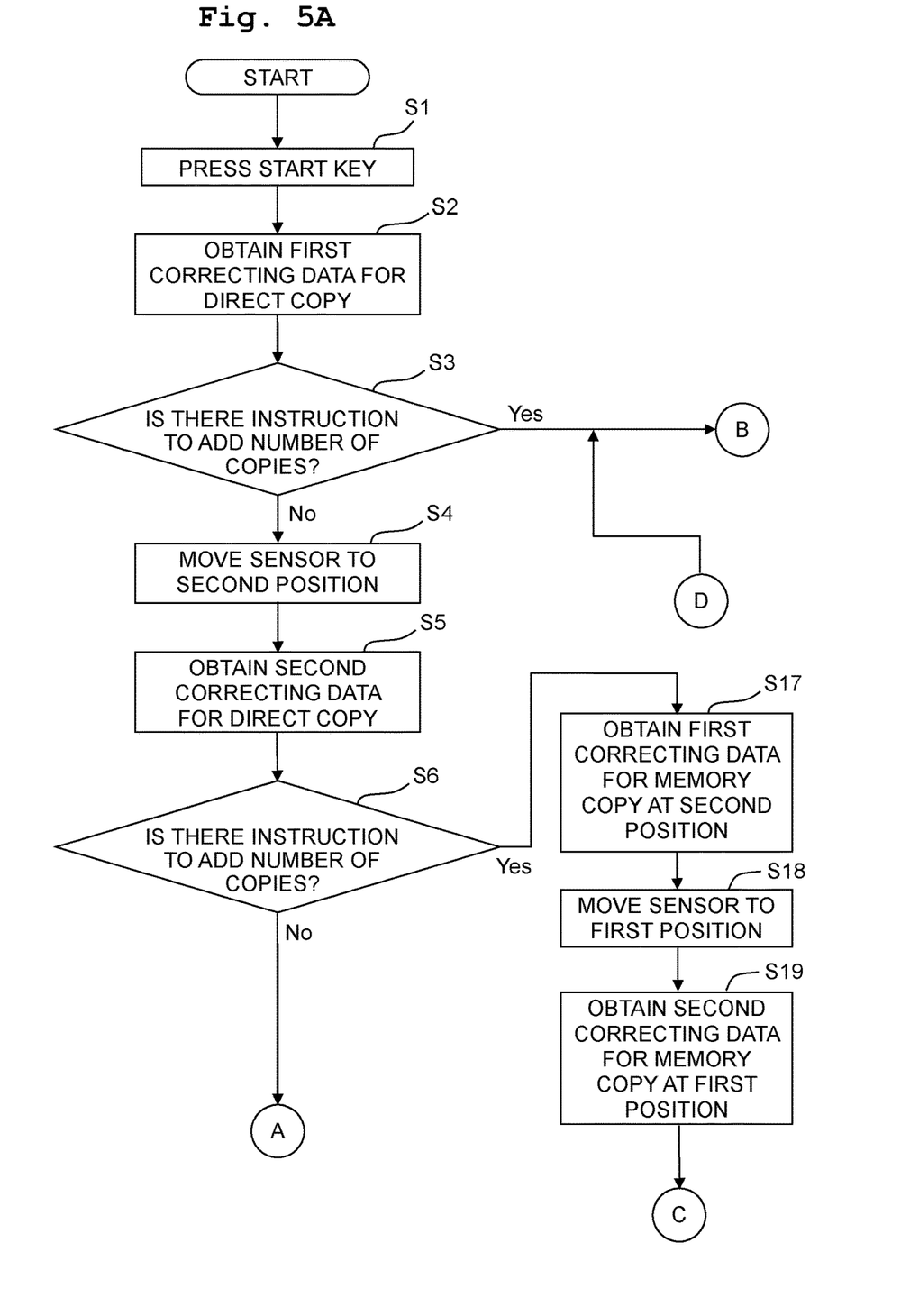
FIGS. 5A to 5C are a flow chart depicting an example of processing performed by a CPU.
Figure 5B:
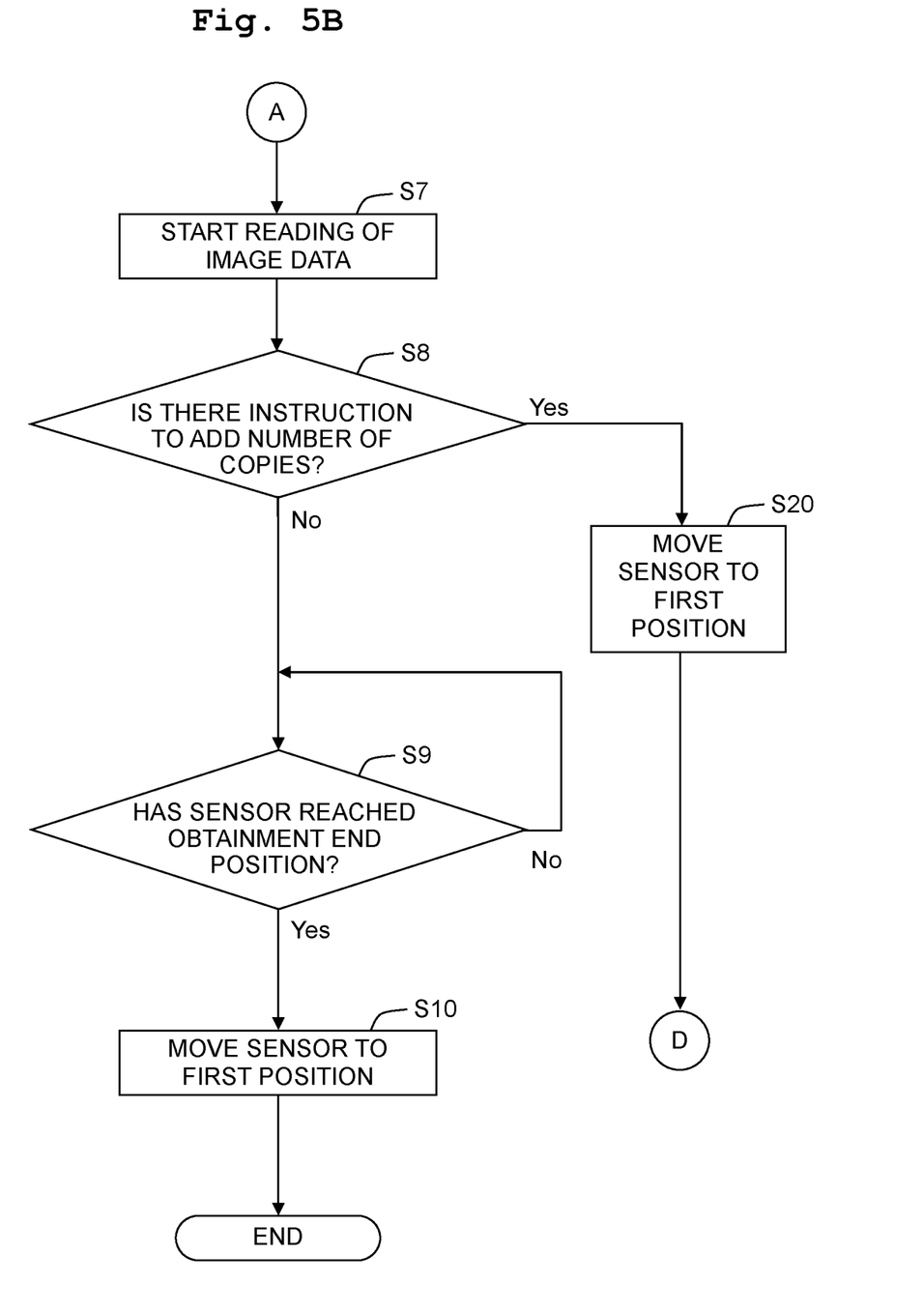
Figure 5C:
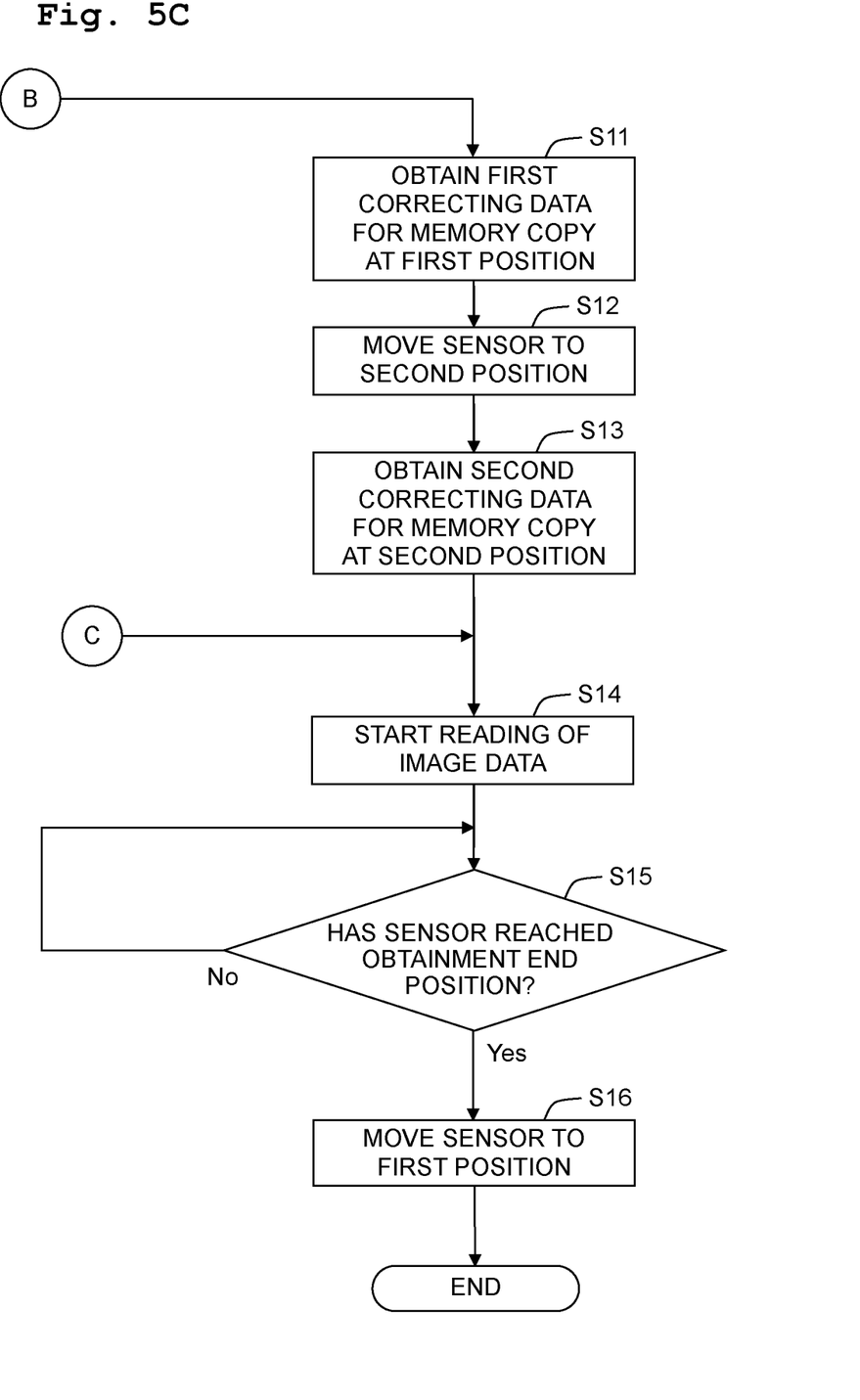

As depicted in FIGS. 5A to 5C, in a case that the start key 31 is pressed by the user and the CPU 41 receives a copying instruction for a first copy (step S1), the CPU 41 firstly starts the direct copy. Specifically, the CPU 41 adjusts the optical amount of the sensor 101, and then the CPU 41 causes the sensor 101 to obtain, at the first position, the first shading correction data for the direct copy (step S2). In this situation, the CPU 41 monitors the pressing of the start key 31 to thereby determine whether or not an adding instruction to add the number of copies is received (step S3).

In a case that there is no adding instruction to add the number of copies (step S3: NO), the CPU 41 moves the sensor 101 to the second position (step S4). Further, the CPU 41 causes the sensor 101 to obtain, at the second position, the second shading correction data for the direct copy (step S5). In this situation, the CPU 41 monitors the pressing of the start key 31 to thereby determine whether or not the adding instruction to add the number of copies is received (step S6).

In a case that there is no adding instruction to add the number of copies (step S6: NO), the CPU 41 causes the sensor 101 to start obtaining the image data (step S7). Specifically, the CPU 41 causes the sensor 101 to obtain the image data, while causing the sensor 101 to move from the second position up to the obtainment end position for obtaining the image data. In this situation, the CPU 41 monitors the pressing of the start key 31 to thereby determine whether or not the adding instruction to add the number of copies is received (step S8).

In a case that there is no adding instruction to add the number of copies while the sensor 101 is moving from the second position to the obtainment end position for obtaining the image data (step S8: NO), and that the sensor 101 reaches the obtainment end position (step S9: YES), the CPU 41 causes the sensor 101 to move up to the first position (step S10), and ends the obtainment of the image data and the obtainment of the shading correction data.

Returning to step S3, in a case that there is the adding instruction to add the number of recorded in a state that the sensor 101 is positioned at the first position (step S3: YES), the CPU 41 causes the sensor 101 to obtain, at the first position, the first shading correction data for the memory copy (step S11). Next, the CPU 41 moves the sensor 101 to the second position (step S12). Then, the CPU 41 causes the sensor 101 to obtain, at the second position, the second shading correction data for the memory copy (step S13).

Next, the CPU 41 causes the sensor 101 to start the obtainment of the image data (step S14). Then, in a case that the sensor 101 reaches the obtainment end position of obtaining the image data (step S15: YES), the CPU 41 moves the sensor 101 to the first position (step S16), and ends the obtainment of the image data and the obtainment of the shading correction data.

Returning to step S6, in a case that there is the adding instruction to add the number of copies in a state that the sensor 101 is positioned at the second position (step S6: YES), the CPU 41 causes the sensor 101 to obtain, at the second position, the first shading correction data for the memory copy (step S17). Next, the CPU 41 moves the sensor 101 to the first position (step S18). Then, the CPU 41 causes the sensor 101 to obtain, at the first position, the second shading correction data for the memory copy (step S19). The processings thereafter are similar to those in steps S14 to S16 as described above.

Returning to step S8, in a case that there is the adding instruction to add the number of copies in a state that the sensor 101 is positioned at a position (segment) between the second position and the obtainment end position of obtaining the image data (step S8; YES), the CPU 41 moves the sensor 101 to the first position (step S20). The processings thereafter are similar to those in steps S11 to S16 as described above.

Here, the spacing distance between the first position and the second position is short. Accordingly, it is necessary that the sensor 101 is moved to the first or second position accurately in order to obtain the shading correction data of the first obtaining position P1 and the second obtaining position P2 in the reference member 51 accurately. This requires to slow the moving velocity of the sensor 101 in the movement from the first position to the second position or in the movement from the second position to the first position. Further, the time for obtaining the first shading correction data and the time for obtaining the second shading correction data become to be long in such a case that the sensor 101 is positioned at the second position when the second operation is performed with respect to the start key 31, and that the sensor 101 is moved to the first position so as to obtain the first shading correction data for the memory copy and then the sensor 101 is moved to the second position again so as to obtain the second shading correction data for the memory copy.

In view of such a situation, in the image forming apparatus 2 of the present embodiment, under a condition that the position determining part 102 determines that the sensor 101 is positioned at the second position in a case that the second operation is performed with respect to the start key 31, the CPU 41 controls the scanner 10 so as to obtain the first shading correction data for the memory copy at the second position (step S17), and then to obtain the second shading correction data for the memory copy at the first position (step S18).

According to the above-described configuration, it is possible to shorten the time for obtaining the first shading correction data and the second shading correction data. Namely, it is possible to perform the copying processing quickly.

Note that in a case that the second operation is performed with respect to the start key 31 while the sensor 101 is moving from the first position to the second position, the CPU 41 moves the sensor 101 up to the second position and causes the sensor 101 to obtain the first shading correction data at the second position. This is performed since it takes a time for performing a processing of reversing the moving direction of the sensor 101 (specifically, switching of the driving direction of a stepping motor which moves the sensor 101). According to the above-described configuration, it is possible to shorten the time required for obtaining the first shading correction data and the second shading correction data.

<Example of Realization by Software>

The control block (in particular, the CPU 41) of the image forming apparatus 2 may be realized by a logic circuit (hardware) formed, for example, in an integrated circuit (IC chip), etc., or may be realized by a software.

In a case that the control block of the image forming apparatus 2 is realized by the software, the image forming apparatus 2 is provided with a computer configured to execute a command or instruction of a program as the software realizing the respective functions. This computer is provided, for example, with one or more processor or processors, and a computer-readable recording medium storing the program. Further, in the computer, the processor reads the program from the recording medium and executes the program to thereby achieve the object of the present disclosure. It is possible to use, for example, a CPU (Central Processing Unit) as the processor. As the recording medium, it is possible to use a "non-transitory tangible (concrete) recording medium" including, other than a ROM (Read Only Memory), etc., for example a tape, disc, card, semiconductor memory, programmable logic circuit, etc. Further, a RAM (Random Access Memory) in which the program is decompressed, etc., may be further provided on the image forming apparatus 2. Furthermore, the program may be supplied to the computer via an arbitrary transmitting medium capable of transmitting the program (communication network, broadcasting wave, etc.). Note that an aspect of the present disclosure can be realized also by an aspect in which the program is a data signal embedded in a carrier wave and materialized by electronic transmittance.

The present disclosure is not limited to or restricted by the respective embodiments as described above; a variety of kinds of changes to the present disclosure is possible within the range indicated in the claims, and any embodiment(s) obtained by appropriately combining the technical means disclosed in different embodiments are also encompassed in the technical range of the present disclosure.

What is claimed is:

1. An image forming apparatus comprising:
   a key configured to receive a copy-start instruction to start copying and an input of a number of copies to be recorded depending on a number of times that the key is operated;
   a scanner configured to read an image of a document and to generate image data relating to the image;
   a printer configured to record the image relating to the image data generated by the scanner, on a sheet;
   a memory; and
   a controller,
   wherein the controller is configured to control the scanner and the printer to execute, depending on the number of times that the key is operated:
   (1) direct copy of storing parts of the image data relating to the image successively in the memory, and of reading the parts of the image data from the memory in a storing order thereof to record the image on the sheet; or
   (2) memory copy of storing entirety of the image data in the memory, and of successively reading parts of the stored image data to record the image on the sheet,
   the scanner is provided with:
     a sensor configured to obtain the image data; and
     a position determining part configured to determine a position of the sensor,
   the controller is configured to position the sensor at a first position and a second position different from the first position, each of the first position and the second position being a position at which shading correction data is obtained, the shading correction data being usable for shading correction performed by the scanner,
   the controller is configured to execute the direct copy in a case that the key is operated one time,
   the controller is configured to switch the direct copy to the memory copy in a case that the key is operated multiple times,
   if the position determining part determines that the sensor is positioned at the first position under a condition that a second operation is performed to the key, the controller is configured to control the scanner to obtain first shading correction data for the memory copy at the first position, and to obtain second shading correction data for the memory copy at the second position after obtaining the first shading correction data for the memory copy, and if the position determining part determines that the sensor is positioned at the second position under the condition that the second operation is performed to the key, the controller is configured to control the scanner to obtain the first shading correction data for the memory copy at the second position, and to obtain the second shading correction data for the memory copy at the first position after obtaining the first shading correction data for the memory copy.

2. The image forming apparatus according to claim 1, wherein if the position determining part determines that the sensor is positioned at a position between the second position and an obtainment end position, at which obtainment of the image data is ended, under the condition that the second operation is performed to the key, the controller is configured to control the scanner to move the sensor to the first position and to obtain the first shading correction data for the memory copy at the first position, and to obtain the second shading correction data for the memory copy at the second position, after obtaining the first shading correction data for the memory copy.

3. An image forming method, in an image forming apparatus provided with: a key configured to receive a copy-start instruction to start copying and an input of a number of copies to be recorded depending on a number of times that the key is operated; a scanner configured to read an image of a document and to generate image data relating to the image; a printer configured to record the image relating to the image data generated by the scanner, on a sheet; and a memory, the image recording method comprising executing, by the scanner and the printer, depending on the number of times that the key is operated:

(1) direct copy of storing parts of the image data relating to the image successively in the memory, and of reading the parts of the image data from the memory in a storing order thereof to record the image on the sheet; or (2) memory copy of storing entirety of the image data in the memory, and of successively reading parts of the image data and to record the image on the sheet, wherein the scanner is provided with: a sensor configured to obtain the image data; and a position determining part configured to determine a position of the sensor, the sensor is configured to obtain shading correction data at a first position and a second position different from the first position, the shading correction data being usable for shading correction performed by the scanner, in a case that the key is operated one time, the direct copy is executed, in a case that the key is operated multiple times, the direct copy is switched to the memory copy, if the position determining part determines that the sensor is positioned at the first position under a condition that a second operation is performed to the key, first shading correction data for the memory copy is obtained by the sensor at the first position, and second shading correction data for the memory copy is obtained by the sensor at the second position after the first shading correction data for the memory copy is obtained, and if the position determining part determines that the sensor is positioned at the second position under the condition that the second operation is performed to the key, the first shading correction data for the memory copy is obtained by the sensor at the second position, and the second shading correction data for the memory copy is obtained by the sensor at the first position, after the first shading correction data for the memory copy is obtained.

4. A non-transitory computer-readable medium storing a program executable by a processor of an image forming apparatus, the image forming apparatus including: a key configured to receive a copy-start instruction to start copying and an input of a number copies to be recorded depending on a number of times that the key is operated; a scanner configured to read an image of a document and to generate image data relating to the image; a printer configured to record the image relating to the image data generated by the scanner, on a sheet; a memory; and the processor, the program, when executed by the processor, causing the image forming apparatus to control the scanner and the printer to execute, depending on the number of times that the key is operated:

(1) direct copy of storing parts of the image data relating to the image successively in the memory, and of reading the parts of the image data from the memory in a storing order thereof to record the image on the sheet, or (2) memory copy of storing entirety of the image data in the memory, and of successively reading parts of the stored image data to record the image on the sheet, the scanner is provided with:
a sensor configured to receive the image data; and
a position determining part configured to determine a position of the sensor, the program causes the sensor to be positioned at a first position and a second position different from the first position, each of the first position and the second position being a position at which shading correction data is obtained, the shading correction data being usable for shading correction performed by the scanner;

the program causes the image forming apparatus to execute the direct copy in a case that the key is operated one time, the program causes the image forming apparatus to switch the direct copy to the memory copy in a case that the key is operated multiple times, if the position determining part determines that the sensor is positioned at the first position under a condition that a second operation is performed to the key, the program causes the scanner to obtain first shading correction data for the memory copy at the first position, and causes the scanner to obtain second shading correction data for the memory copy at the second position after causing the scanner to obtain the first shading correction data for the memory copy, and if the position determining part determines that the sensor is positioned at the second position under the condition that the second operation is performed to the key, the program causes the scanner to obtain the first shading correction data for the memory copy at the second position, and causes the scanner to obtain the second shading correction data for the memory copy at the first position after causing the scanner to obtain the first shading correction data for the memory copy.

* * * * *

UNITED STATES PATENT AND TRADEMARK OFFICE
CERTIFICATE OF CORRECTION

PATENT NO. : 10,924,631 B2
APPLICATION NO. : 16/798571
DATED : February 16, 2021
INVENTOR(S) : Takashi Maeda Page 1 of 1

It is certified that error appears in the above-identified patent and that said Letters Patent is hereby corrected as shown below:

In the Claims

Column 11, Claim 3, Line 43 should read:
image data to record the image on the sheet Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*